Aug. 19, 1969   J. O. BENSON   3,462,276
PROCESS FOR PRODUCING A TUBULAR, PUFFED PRODUCT
Filed Jan. 29, 1965   2 Sheets-Sheet 1
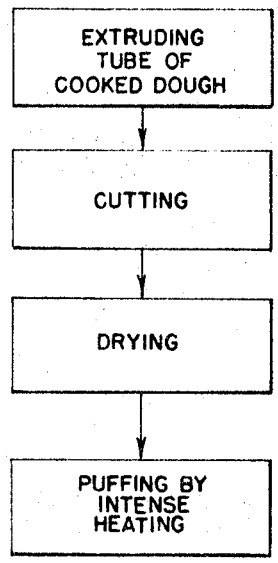
FIG. I
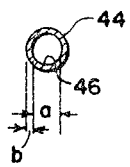
FIG. 2B
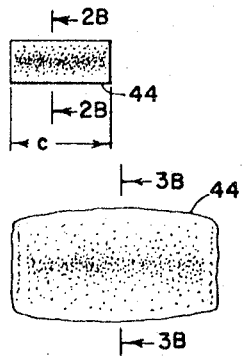
FIG. 2A
FIG. 3A
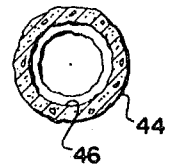
FIG. 3B
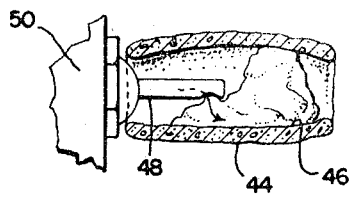
FIG. 4
INVENTOR.
JOHN O. BENSON
BY Robert B. Hughes
ATTORNEY Aug. 19, 1969   J. O. BENSON   3,462,276
PROCESS FOR PRODUCING A TUBULAR, PUFFED PRODUCT
Filed Jan. 29, 1965   2 Sheets-Sheet 2
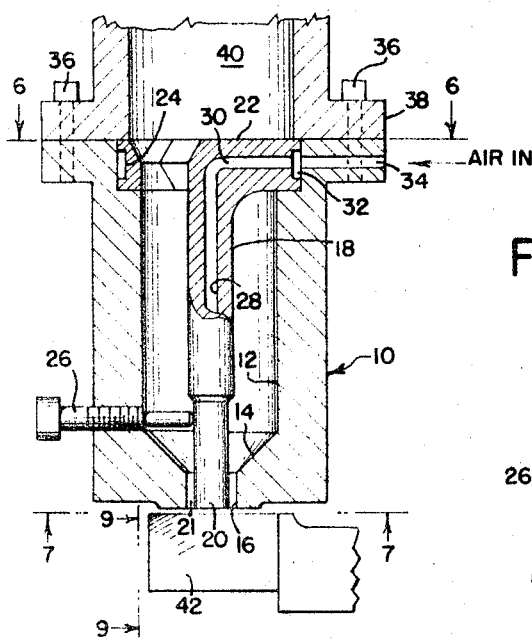
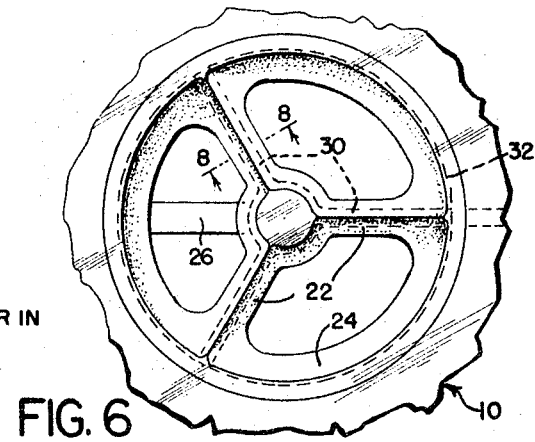
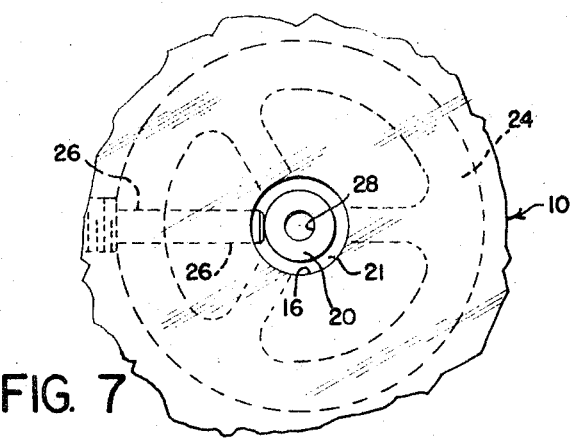
INVENTOR.
JOHN O. BENSON
BY
*Robert B. Hughes*
ATTORNEY United States Patent Office 3,462,276
Patented Aug. 19, 1969

3,462,276
PROCESS FOR PRODUCING A TUBULAR,
PUFFED PRODUCT
John O. Benson, Mayer, Minn., assignor to General Mills,
Inc., a corporation of Delaware
Filed Jan. 29, 1965, Ser. No. 429,171
Int. Cl. A23l 1/18, 1/10
U.S. Cl. 99—81                                              4 Claims

ABSTRACT OF THE DISCLOSURE

Tubular puffed snack products are produced by extruding a cooked dough in a tubular configuration at a given temperature and prescribed dimensions, cutting the tube into specified lengths, drying and puffing. The puffed products may be filled with an edible filling.

---

The present invention relates to a new and improved food product and to a method for making the same, which food product can properly be categorized as a "snack."

The food products which are sold in the general category of snack items are many and varied, including such things as chips (e.g., potato chips or corn chips), puffs (e.g., corn puffs), etc., and they account for a large dollar volume in the food industry. Generally, these are eaten apart from a regular meal, for example, as party snacks or as appetizers, sometimes with spreads or fillings, or the like. Often different snack items are served at the same time, perhaps in different snack dishes or in an hors d'oeuvre tray presenting a variety of these and other food items for the choice of the guests or customers.

People generally regard these snacks rather discriminatingly and do not expect to gain from them a great deal of their day's nourishment. Rather a person will sample the various snacks in a leisurely manner, centering his choice on those snacks which have some sort of special appeal. Thus it is quite understandable that while manufacturers of snacks have done considerable work in developing refinements in their established products and in maintaining good quality control in the manufacture thereof, a good deal of creative effort has been directed toward making snack products which are distinctive in some regard, so that such a product might have some particularly appealing quality not existing in other snack products.

One type of snack product which has been found to be especially appealing is a puff-type snack which is made by forming a cooked dough into pieces of the desired shape and then puffing these pieces by subjecting them to an intense heating, such as by deep fat frying, salt puffing, or heating in some type of oven. Some snack products of this type made from a corn dough have experienced a good deal of commercial success. This step of intensely heating the dough not only develops delectable flavor characteristics in the end product, but also gives a very desirable puffed, low density structure that has a crisp, yet tender texture. If the intense heating is performed by means other than deep fat frying, the end product is often sprayed with oil (this contributing to the flavor of the product), and the product is sometimes salted or coated with some other substance such as cheese-like particles.

Because of the nature of the processing steps required for this type of snack product, it has been especially difficult to devise any improvements which can practically be incorporated in the process. For example, the main ingredients, the method of cooking and the manner of puffing by intense heating all must be controlled within rather well defined limits to obtain the desired qualities of taste, texture, etc. of the end product. The pieces of dough which are to be subjected to the intense heating must be so shaped that they will puff uniformly. Further, this puffing by intense heating will usually expand and bend the pieces somewhat unpredictably so that even though the dough pieces prior to the intense heating can be formed into a rather precise shape, this precision will be largely lost in the subsequent intense heating, and the pieces will twist and bend into various configurations. Thus for these and perhaps other reasons, in spite of the commercial importance of snack products (hundreds of millions of dollars worth being sold annually), the significant and original improvements in snack products have been relatively few.

When these puff-type snacks are eaten with a dip or spread, the snack pieces are usually placed on the same tray or table as the dip but separate therefrom so that a person can take a snack piece in hand and scoop up a portion of the dip. Less often, the snack pieces are served with the dip or spread already applied thereto, this probably being done more often with crackers or cracker-like snack products. Perhaps one reason for this is that while these puff-type snacks are rather irregular in shape, crackers are more uniform in size and shape so that they can be arranged more conveniently, and they generally present a flat surface so that they can more easily be placed on a tray without spilling or smearing the spread or other product placed thereon. Also crackers can easily be placed one on top of the other with spread in between to make a "cracker-sandwich," so that the spread will have less tendency to dry out. However, another factor is that this puff-type snack product usually has a tendency to break unpredictably when a person bites into the snack piece. The result is that if the snack pieces are each covered with a spread, the chances are that as the pieces are eaten, parts of the snack pieces not yet in the person's mouth break off and fall away with the spread placed thereon smearing on the floor or on the person himself. Thus, the more practical approach has been to serve the dip or spread separately in a dish. A person can then take the snack in hand and scoop a portion of dip onto one edge or end of the snack piece. Then the person can place that edge or end of the snack piece in his mouth in such a manner that the dip is entirely within his mouth, and any portion of the snack piece outside his mouth that breaks away will at least not have any dip thereon to cause any smearing.

In exploring new approaches to the making of snacks, it was discovered that by forming snack pieces with a particular size and configuration and properly processing the same, not only is the snack product very well adapted to being processed so as to develop the taste, texture, cell structure and other characteristics desired in a high quality puffed-type snack product, but it has unusual advantages in the manner in which it can be eaten, and especially in the manner in which it can be eaten with a snack dip or a similar product. When a person bites into a snack piece made according to the present invention, the piece very rarely has a part thereof break off and fall away. Instead, when a person bites off part of the snack piece, the rest of it remains intact, and it too can be conveniently bitten into without a part of the then remaining portion fracturing off and falling away. Also, if the piece is to be eaten by a person scooping it into the dip, then biting away that portion of the snack piece that carries the dip, and then scooping out another dip portion with the remaining part of the snack piece, it is rare that the piece or the portion remaining after a part is bitten away will ever break off into the dip.

Another advantage is that prior to serving, the snack pieces of the present invention can very conveniently be filled with a dip, spread or other product, and especially such a product which is dispensed from a nozzle, as in the instance of a pressurized can which discharges its product through a dispensing stem (such units being commercially available). Further, these snack pieces can very advantageously be filled prior to serving with a low density filler product. Not only is the product kept somewhat isolated in the snack piece from the atmosphere to prevent drying out, but when the piece is bitten into, no pressures are exerted on the filler product to cause it to collapse or squeeze out.

Thus it may be recited as an object or objects of the present invention to provide a puff-type snack product and a process for making the same, which product, while being a high quality product of desired flavor, texture, etc., is very convenient to eat, especially with a snack dip or the like that is served separately from the snack pieces, and also which lends itself to being conveniently filled with a product prior to serving, especially a product which is dispensed from a nozzle or stem, and also with a product that is a low density and/or easily displaced product.

Another facet of the present invention is that when the pieces are subjected to deep fat frying as the intense heating step, a lower percentage of the frying oil is absorbed by the product in comparison with other snack products that are deep fat fried. Of course, there are other methods of accomplishing the final intense heating other than deep fat frying, and these other methods can be used quite well to produce a high quality snack product, but when it is desired to obtain a product having the particular characteristics of flavor and texture resulting from deep fat frying, the snack product of the present invention has the desirable feature of limiting the fat or oil content of the end product.

Thus it may be stated as another object to provide a snack product which, when it is deep fat fried, results in a high quality product, while absorbing less of the frying oil in comparison with other deep fat fried snack products.

These and other objects and features of the invention will be more readily understood and appreciated from the following detailed description of the preferred embodiments thereof selected for purposes of illustration and shown in the accompanying drawings in which:

FIGURE 1 is a diagrammatic sketch illustrating the process of the present invention;

FIG. 2A is a side elevational view of the tubular piece of dough which is ready to be puffed by intense heating;

FIG. 2B is a transverse sectional view taken on line 2B—2B of FIG. 2A;

FIG. 3A is a side elevational view of the piece shown in 2A after being puffed by intense heating;

FIG. 3B is a transverse sectional view taken on line 3B—3B of FIG. 3A;

FIG. 4 is a side elevational view of the puffed snack piece shown in FIG. 3A, with a portion thereof broken away, and showing the manner in which a filler can be injected into said piece through a nozzle.

FIG. 5 is a side elevational view taken partly in section of an extruding device suitable for use in the present invention;

FIG. 6 is a sectional view drawn to an enlarged scale and taken on line 6—6 of FIG. 5;

FIG. 7 is a view drawn to the same scale as FIG. 6 and taken at 7—7 of FIG. 5;

FIG. 8 is a sectional view taken along line 8—8 of FIG. 6; and

FIG. 9 is a view drawn to the same scale as FIG. 6 and taken from the location indicated at 9—9 of FIG. 5.

The process of the present invention can be described somewhat generally as:

(a) Forming a cooked cereal dough (the character of which will be described more fully hereinafter) in a tubular configuration which:

(1) has a wall thickness at least between about .015 inch to .070 inch, and (2) has an inside diameter at least between about ⅛ inch to ½ inch.

(b) Cutting said tube into lengths of at least about ¼ inch in length, and (c) Subjecting said tube lengths to an intense heating so as to puff the same to form the finished product.

The present invention will now be described with more particularity.

The ingredients for the dough which is made into the end snack product are primarily a cereal product and water. Corn, wheat, oats, barley, rye, and other cereals and combinations thereof are suitable for use in the present invention, and generally the dehulled cereal product is used (e.g., corn grits). Of course, other ingredients can be, and preferably are, incorporated in addition to the cereal products and the water, to give a particular character to the flavor and other qualities of the end product. For example, salt, sugar, starch and gums could quite advantageously be added. The selection and quantity used will depend largely upon the character desired for the end product, and there are, of course, certain practical limits (known generally in the art), as to the quantity of the various ingredients to be used. For example, the sugar should be limited to about 12% of the total ingredients or possibly less, since during the puffing by intense heating, the product will tend to burn if an excessive amount of sugar has been incorporated into the product. Generally the cereal ingredient or ingredients will make up at least 50% of the total ingredients by weight. However, it is to be understood that varying amounts of starch may be substituted for part of the cereal ingredient or ingredients, and possibly a certain amount of an inert substance (e.g., cellulose or fiber containing material might also be added this perhaps being done if a low-calorie type of snack product is desired).

The ingredients are mixed and cooked to form a gelatinized dough. One suitable method is to use one of the continuous cookers known in the art which cook the ingredients in a steam-jacketed cooker. Another method is to cook the ingredients mechanically (i.e., work the ingredients mechanically so as to impart heat to the same).

Often, in these cooking processes, water is added to the ingredients during the course of the cooking. The amount of water used as an original ingredient and the amount of water added during the course of the cooking should be such that the moisture content of the cooked dought at the completion of the cooking be between about 20% and 35% based upon total weight. At this moisture content, the dough is in the best condition for further processing.

After being cooked, the dough is formed into a tubular configuration of predetermined dimensions. This is conveniently done by forcing the dough (as by means of an auger-type feed mechanism known in the art) through an extrusion die, such as that shown in FIGS. 5 through 9. This particular extrusion die is that used in an apparatus which is the subject matter of patent application Ser. No. 546,710, filed May 2, 1966, by Mark Hasten, Floyd Lobash and Dennis L. Pommer, entitled Extrusion Apparatus, now issued as Patent No. 3,396,676 on Aug. 13, 1968. The dough should be extruded at a temperature sufficiently low so that there is no significant puffing of the dough as it is extruded. Normally, this temperature will be below the boiling point of water at the ambient pressure (which would usually be atmospheric).

This extrusion die comprises a housing 10, the inner surface of which is formed as three portions: (a) a vertically aligned cylindrical bore 12 which defines an extruding chamber, (b) a downwardly tapering frusto-conical portion 14 leading from the lower edge of the cylindrical bore 12 and defining a transition passageway, and (c) a cylindrical bore 16 which leads from the tapered end of the frusto-conical surface 14 and cooperates in defining an extrusion orifice.

Extending downwardly through the extrusion chamber, the transition passageway and into the space defined by the surface 16, is a stem member 18 whose lower end portion 20 serves the function of a forming stem in conjunction with the wall surface 16 to define an annular orifice 21. The upper end of the stem 18 is formed integrally with three radially extending spokes 22, the outer ends of which are in turn formed integrally with a ring portion 24 by which the stem unit 18 is mounted to the housing 10. The stem unit 18 is initially formed in such a manner that the forming stem portion 20 is slightly off-center with respect to the orifice wall 16, and an adjusting screw 26 is mounted at the lower end of the housing 10 to push against the lower portion of the stem 18 to properly center the forming portion 20 thereof.

The stem 18 is provided with an axially aligned center air passageway 28 which opens to the atmosphere at the discharge or forming end 20 of the stem 18. At its upper end this passageway 28 leads into each of three passageways 30 formed in a respective one of the spokes 22, and each of the passageways 30 in turn communicates with an annular passageway 32 formed in the mounting ring 24. During the extrusion operation, air is fed through a fed passage 34 in the housing 10 to this annular passage 32 through the passageways 30 and into the air passage 28. This aids in the proper formation of the extruded tube of dough, probably by providing interior support for the tube and also cooling the inner surface of the same.

The upper or infeed end of the housing 10 is mounted by bolts 36 to a main housing 38, in which is formed a passageway 40 from which dough to be extruded is fed into the extrusion chamber defined by the surface 12 of the housing 10. The dough passes from the extrusion chamber through the tapering passageway defined by the frusto-conical surface portion 14 and into the annular orifice 21 defined by the surface 16 and the forming stem 20. The dough emerges from the orifice 21 in a tubular configuration and is cut after it emerges from the orifice 21, as by a blade 42 moving transversely to the direction of extrusion of the dough. The action of the blade 42 is so timed in relation to the rate of extrusion that the tubular pieces cut by the blade 42 are each of the desired length. The dough being extruded is at a temperature sufficiently low so that it will not puff when emerging from the extruling orifice 21'. (Since the dough is normally extruded to atmospheric pressure, this temperature would not be above 212° F.) There is of course some elastic deformation as the dough passes through the orifice 21, but this is to be distinguished from puffing that would occur if there were an immediate boil off or flashing by reason of extruding the dough at a temperature above 212° F.

As indicated previously, the dimensions of the extruded pieces (one of which is shown at 44 in FIGS. 2A and 2B) which are to be puffed into the final product are quite significant in the present invention. The inside diameter of each piece (indicated at "$a$" in FIG. 2B) should be greater than one-eighth inch and for best results should be at least about three-sixteenths inch, since with the diameter too small it is simply not practical during the subsequent intense heating for the puffing or heating medium (e.g., frying oil if deep fat frying is employed, or salt particles if salt puffing is used) to be able to pass sufficient heat to the inside surface 46 of the piece 44 to accomplish properly the puffing by intense heating. On the other hand the inside diameter should be no greater than about half an inch and for best results should be no greater than about three-eighths of an inch. With the diameter too large, not only does it become impractical to fill with a spread or dip the tubular piece which is the end proruct, but the end product fractures and breaks up too easily when being eaten.

Also, with the inside diameter too large, during the intense heating the wall of the piece tends to bend and warp from a rather regular tubular configuration, while the pieces having an inside diameter within the desired dimensions, in being puffed during the intense heating, keep to a greater degree their regular tubular configuration. It can be theorized that with the inside diameter within the proper limits, the space within each piece 44 is sufficiently large to permit enough heat transfer to the inside surface 46 of the piece 44 to obtain proper puffing, and yet this inside space is small enough that the gases (e.g., steam) emitted from the inside surface 46 of the piece 44 offer some center support to prevent the wall of the piece 44 from collapsing inwardly. Perhaps also within the desired dimensions there is sufficient curvature of the wall to give a certain "arch-like" support to prevent portions of the wall from collapsing inwardly.

The wall thickness (indicated at "$b$" in FIG. 2B) of the piece 44 before the puffing by intense heating is also significant in the present invention and should be at least between .015 and .07 inch, and for best results should be between .025 and .06 inch. With too small a wall thickness, the piece 44 shatters too easily upon being eaten, and with too large a wall thickness it is not possible to obtain complete and uniform puffing during the intense heating.

The length (indicated at "$c$" in FIG. 2A) of each piece 44 should be between at least about one-quarter inch and one and one-half inches, and for best results should be between about one-half inch and one inch. With the piece 44 too long, it is not possible for the intense heating medium (e.g., frying oil or salt particles) to have sufficient access into the interior of the piece 44 to impart enough heat to properly puff the same. With the length too small, a great deal of the convenience of filling the pieces 10 with a spread is lost. (This will become more apparent when this facet of the invention is discussed hereinafter.)

After the extruding and cutting to form the tubular pieces 44, these pieces 44 are dried to a moisture content between about 7 to 12% (based on total weight) and desirably to between about 8–10%. Within this approximate range, the pieces can be puffed properly during the subsequent intense heating. This drying can conveniently be accomplished by exposing the pieces to the surrounding atmosphere at room temperature for about a half day or a day, or moderately hot air (e.g., having a temperature of perhaps about 150° F.) can be passed through the pieces for a suitable period (e.g., about 4 hours). If the latter method of drying is used, it is usually desirable afterwards to let the tube lengths stand for about 2 hours at room temperature, so that the moisture contained therein will equalize throughout the product.

These tube lengths 44 are then subjected to an intense heating, such as that which is commonly employed in cereal-type products such as some ready-to-eat breakfast cereals and various snack products. This intense heat not only develops certain desired flavor components in the product but also serves to puff and expand the same so as to approximately double the overall dimensions and give the product a desired lightness in texture and cell structure, along with a certain degree of crispness. The precise manner by which this intense heating is accomplished will depend upon various things, such as the character of the end product desired, the practicality of using the same in a particular commercial operation, etc. However, this intense heating should be done in such a manner that an adequate amount of heat is transfered to the inside surface 46 of each piece 44. Deep fat frying has been found to be quite acceptable in this respect, and so has salt puffing. One method of accomplishing this salt puffing is to feed the pieces 44 into a rotating drum containing discreet heated salt particles which surround the pieces 44. The drum is rotated at a rate sufficient to keep the pieces 44 immersed in salt so that salt particles pass inside the pieces 44 sufficiently to puff the pieces 44 from the inside as well as the outside.

The processing conditions necessary for puffing by intense heating are well known in the art. Thus when a salt puffer is used the temperature of the salt particles should be between about 300 to 450° F., and desirably between about 380 to 420° F., and the residence time in the drum would be between about 20 to 24 seconds. If deep fat frying is used as the particular means of accomplishing the final intense heating, the oil fat temperature would be between about 320 to 420° F., and for best results at about 390 to 400° F., and the frying time would be about 10 to 25 seconds. As is well known in the art, these conditions will vary depending upon such things as the wall thickness of the pieces being puffed, etc.

As indicated earlier in the objects herein, when these tubular pieces 44 are deep fat fried, a smaller percentage of the cooking oil (e.g., about 10% to 25% less) is absorbed in the product than would be expected. This amount will, of course, vary depending upon the precise dimensions of the product and perhaps other conditions, but it was found that with the tube pellet lengths before frying having an inside diameter of about 19/64 inch, a wall thickness of about 3/64 inch, and a length of about 3/4 inch, and with the oil bath being at about 385° F. and the residence time being about 10 seconds, that the amount of oil absorbed in the tube lengths during the deep fat frying was about 27 to 30%, based upon total weight. When pieces having a similar wall thickness but not arranged in the same tubular configuration were deep fat fried under similar conditions, the amount of oil absorbed was about 32 to 35%, based upon total weight. This reduction of the content of the frying oil is beneficial not only with respect to the saving in the amount of cooking oil used, but it is also believed to improve the stability of the product and the "feel" of the same in that it has a less greasy texture.

It has been found that with a tubular snack product which is within the dimensions specified herein, the puffed structure of the product contributes significantly to the structural stability of the same (i.e., that quality which enables the snack piece not to break up when a person bites into the same). Generally speaking, the density should be at least as low as about 6 pounds per cubic foot to give the pieces this character of structural stability and yet provide it with a texture and cell structure which is desirable for a puffed-type snack product, and most desirably would be between about 4 to 5 pounds per cubic foot. (These densities are based on weight of the product not including any oil that would be absorbed during frying or added in some other way such as by spraying if the product is not deep fat fried.)

After this intense heating, the snack pieces 44 can, if desired, be given a further treatment such as coating with some material, such as cheese particles, salt, etc.

As indicated previously, the snack pieces which make up this end product (as shown in FIGS. 3A and 3B) are such that they can very conveniently be eaten without breaking up and falling to the table or floor. The individual snack piece is generally grasped by one end, and a portion thereof is placed in the mouth. When the person bites into the snack piece, that portion which remains outside the mouth will not break up, and the remaining piece can then be either bitten into again or placed in the mouth. It is rare that any part of the snack piece would fall away to drop to the floor or table. This is true even if the snack piece is inserted into the side of the mouth and bitten off at an angle.

Also, as indicated previously, the snack pieces can very conveniently be filled with a dip-like material (e.g., a viscous cheese filling). One especially convenient method of doing this is illustrated in FIG. 4, wherein is shown a dispensing stem or nozzle 48 on a pressurized can 50 being inserted into one end of the snack piece 44. When the filling is caused to be discharged from the stem 48, as by tilting the stem 48, a portion of filling material 52, as it is discharged, engages the inside wall surface 46 of the snack piece 44 and spreads across the interior cavity of the piece and then fills back toward the dispensing stem 48. Very rarely will the filling discharge through the opposite end of the snack piece 44. Inside the snack piece 44, the dip or filling material has only a small portion thereof exposed to the surrounding atmosphere, and thus it will not dry out for an appreciable length of time.

When these filled snack pieces are served, they can be placed in a bowl one on top of the other, without the dip or filling material smearing on the pieces, and when being eaten, not only will the snack piece not shatter or break away, but because the filling is not subjected to any pressure by a person biting into the tube, a low density whipped filling can be used without such filling being squeezed out, as would be the case in a cracker-sandwich type product.

The present invention will be disclosed with more particularity in the following examples:

Example I

The following ingredients are utilized:

| | Percent |
|---|---|
| Corn flour | 52 |
| Oat flour | 7 |
| Wheat starch | 3.5 |
| Salt | 2.0 |
| Sugar | 5.5 |
| Water | 30 |

A gelatinized dough is formed by cooking these ingredients in a jacketed cooker for a period of about 60 min. with the steam pressure in the jacket surrounding the cooking chamber being about 10 pounds per square inch. This gelatinized dough is fed by means of an auger-like extruder of the type produced by Ambretti Company through a die such as that shown in the accompanying drawings to form a tube of dough, the inside diameter of which is 19/64 inch and the wall thickness of which is 3/64 inch. This tube is immediately cut into lengths of about 3/4 inch and these pieces are dried by passing air at a temperature of 150° F. through said pieces for about four hours to reduce the moisture content thereof to about 8%. These tubular pieces are permitted to stand for about four hours and are fried in coconut oil of a temperature of 390° F., for about 10 seconds.

The resultant product is a high quality puffed snack product having a tubular configuration.

Example II

The same procedure is followed as in Example I, except that instead of deep fat frying the tubular pieces, the pieces are placed in a rotating drum having salt particles at a temperature of about 420° F., the pieces being in the drum about 22 seconds.

Example III

The same process is followed as in Example II, except that the inside diameter of said lengths before puffing is 3/16 of an inch.

Example IV

The same process is followed as in Example II, except that the inside diameter of said lengths before puffing is 3/8 of an inch.

Example V

The same process is followed as in Example II, except that the thickness of said lengths before puffing is about 4/64 of an inch.

Example VI

The same process is followed as in Example II, except that the thickness of said lengths before puffing is about 2/64 of an inch.

Example VII

The same process is followed as in Example II, except that the tube is cut to lengths of 1/2 inch.

Example VIII

The same process is followed as in Example II, except that the tube is cut to lengths of 1 inch.

It should be understood that the foregoing is merely illustrative of a certain embodiment of the invention and many variations may be made by those skilled in the art without departing from the spirit and scope of the invention.

Now therefore I claim:

1. A process for making a tubular puffed snack product, said process comprising:
   (a) forming a cooked dough into tubular pieces that are such that the inside diameter of said tube is between about 1/8 to 1/2 inch, the wall thickness of said dough is between about .015 to .070 inch, and the length of said pieces is at least about 1/4 inch,
   (b) drying said pieces to a moisture content ranging from about 7–12% based upon total weight, and
   (c) subjecting said pieces to an intense heating so as to puff the same to a density as low as 6 pounds per cubic foot, thereby producing a tubular puffed product capable of being filled with an edible filling.

2. The process as recited in claim 1, wherein said intense heating is accomplished by deep fat frying said pieces, whereby by virtue of the configuration of said pieces, the amount of frying oil absorbed by said pieces is at least as low as about 30%, based upon total weight of the end product.

3. A process for making a tubular puffed snack product, said process comprising:
   (a) extruding a cooked dough in a tubular configuration at a temperature below which said dough would puff by such extrusion and in a manner such that the inside diameter of said tube is between about 3/16 to 3/8 inch, and the wall thickness of said dough is between about .025 to .06 inch,
   (b) cutting said tube into pieces having a length of at least about 1/2 inch, and
   (c) drying said pieces to a moisture content between about 7 to 12% based upon total weight, and
   (d) subjecting said pieces to an intense heating so as to puff the same to a density at least as low as 6 lbs. per cubic foot, thereby producing a tubular puffed product capable of being filled with an edible filling.

4. The process as recited in claim 3, wherein said pieces are cut to a maximum length of about one inch.

References Cited

UNITED STATES PATENTS

| | | | |
|---|---|---|---|
| 1,890,697 | 12/1932 | Scanlan | 99—81 |
| 2,954,296 | 9/1960 | Clausi et al. | 99—82 |
| 3,054,677 | 9/1962 | Graham | 99—82 |
| 3,190,755 | 6/1965 | Peden | 99—81 |

RAYMOND N. JONES, Primary Examiner

U.S. Cl. X.R.

99—83